US012293868B2

(12) United States Patent
Yan et al.

(10) Patent No.: US 12,293,868 B2
(45) Date of Patent: May 6, 2025

(54) NdFeB PERMANENT MAGNET WITH HIGH COERCIVITY AND HIGH RESISTIVITY AND METHOD FOR PREPARING THE SAME

(71) Applicant: NINGBO KETIAN MAGNET CO., LTD., Zhejiang (CN)

(72) Inventors: Changjiang Yan, Zhejiang (CN); Nijian Qian, Zhejiang (CN); Zhiguo Wu, Zhejiang (CN)

( * ) Notice: Subject to any disclaimer, the term of this patent is extended or adjusted under 35 U.S.C. 154(b) by 718 days.

(21) Appl. No.: 17/544,745

(22) Filed: Dec. 7, 2021

(65) Prior Publication Data

US 2022/0328244 A1 Oct. 13, 2022

(30) Foreign Application Priority Data

Apr. 9, 2021 (CN) ......................... 202110385184.8

(51) Int. Cl.
*H01F 41/26* (2006.01)
*H01F 1/057* (2006.01)
*H01F 41/02* (2006.01)

(52) U.S. Cl.
CPC ......... *H01F 41/026* (2013.01); *H01F 1/0576* (2013.01); *H01F 41/0293* (2013.01)

(58) Field of Classification Search
CPC .... H01F 1/0576; H01F 1/0577; H01F 41/026; H01F 41/0293
See application file for complete search history.

(56) References Cited

U.S. PATENT DOCUMENTS

2016/0297028 A1* 10/2016 Sagawa .................. B23K 20/14
2021/0166870 A1* 6/2021 Wang .................. H01F 41/0293
2021/0296049 A1* 9/2021 Xu .......................... H01F 1/053

* cited by examiner

*Primary Examiner* — Jie Yang
(74) *Attorney, Agent, or Firm* — Clement Cheng

(57) ABSTRACT

The invention discloses an NdFeB permanent magnet with high coercivity and high resistivity and a method for preparing the same. The method comprises the steps of: spraying powdery slurry containing heavy rare earth compounds, oxides and/or carbides on a flaky NdFeB permanent magnets blank after it is subjected to surface cleaning process; then stacking magnets on top of each other, and performing three-stage heat treatment on the stacked magnets to obtain the NdFeB permanent magnet with high coercivity and high resistivity. Heavy rare earth penetrates into interior of the flaky magnets at a high temperature, so that coercivity of the flaky magnets is improved. However, part of the heavy rare earth elements or alloy elements and carbide powder or oxide powder, which are not penetrated into the flaky magnets, form an interlayer bonding two of flaky magnets together.

12 Claims, 2 Drawing Sheets

NdFeB PERMANENT MAGNET WITH HIGH COERCIVITY AND HIGH RESISTIVITY AND METHOD FOR PREPARING THE SAME

BACKGROUND OF THE INVENTION

1. Field of the Invention

The invention relates to the field of rare earth permanent magnet materials, and more particularly, to an NdFeB permanent magnet with high coercivity and high resistivity and a method for preparing the same.

2. Description of the Related Art

Due to the fact that NdFeB permanent magnet materials have high energy products, they have been widely used in all kinds of industries and applications like in wind power generation, new energy vehicles, variable-frequency air conditioner, and industrial motors. In those applications, magnet operating temperature is relatively high, and it has higher requirements on magnetic steels in terms of resistance to high temperature. Therefore, those skilled in the art have conducted a lot of researches into the performance of resistance to high temperature for the magnetic steels, and provide two methods to improve temperature resistance of the magnet:

Method 1: improve coercivity of the magnet:

coercivity of the magnet is improved by adding heavy rare earth (e.g., Dy or Tb) to NdFeB alloy. Generally, addition of 1 wt. % Dy to the alloy will increase the coercivity by 2 kOe, and addition of 1 wt. % Tb to the alloy will increase the coercivity by 4 kOe. However, such a method has disadvantages that remanence of the magnet is reduced and material costs are increased significantly. Thus, in order to overcome those disadvantages, some NdFeB manufacturers develop grain boundary diffusion technique. The technique is mainly used to apply heavy rare earth fluorides to the surface of the magnet, and after the magnet is subjected to thermal diffusion treatment, heavy rare earth can enter the interior of the magnet, and forms a $(Nd, Dy)_2Fe_{14}B$ phase with a high magnetocrystalline anisotropy field on the surface of the crystalline grain, thereby increasing the coercivity of the magnet. Although coercivity is increased by this method, it is impossible to increase resistivity of the magnet. For the magnetic steel in a motor, temperature rise from eddy cannot be effectively reduced.

Method 2: reduce eddy generated during the operation of the magnetic steel:

the temperature of the magnetic steel in the motor rises due to the influence of eddy, which leads to the reduction of the remanence and coercivity of the magnet. There are usually two ways to reduce eddy. The first one is to add oxide powder, such as calcium oxide or fluoride powder, to the magnet. This impurity powder is mixed with NdFeB magnetic powder and then sintered, which will reduce the performance of the magnet. The second way is called the component method. This method is to cut the magnetic steel into small pieces of magnetic steels and bond them together with glue to form a magnetic steel component, thereby increasing the resistance of the overall magnetic steel and further reducing the eddy loss. For this method, the process has a long technological flow and its processing cost is high.

Therefore, there is a need to provide a method for preparing an NdFeB permanent magnet with low cost, so that the prepared NdFeB permanent magnet exhibits high coercivity and high resistivity.

SUMMARY OF THE INVENTION

In order to achieve the above-mentioned objects, the present invention provides an NdFeB magnet with high coercivity and high resistivity and a method for preparing the same. It is known that the simple grain boundary diffusion process has some disadvantages of low resistivity, high costs for processing of components, and long and complex process. The method provided herein is capable of overcoming those disadvantages, and allows the technical object of improving temperature resistance of the magnet to be achieved.

According to one aspect of the invention, there is provided a method for preparing an NdFeB permanent magnet with high coercivity and high resistivity, comprising the steps of:

Step S1, preparing a flaky NdFeB magnet blank;

Step S2, treating the NdFeB magnet blank by using surface cleaning process, so as to obtain a clean NdFeB magnet blank;

Step S3, coating a layer of slurry on a surface of the clean NdFeB magnet blank to obtain a coated NdFeB magnet blank, wherein the slurry comprises heavy rare earth powder, compound powder and organic solvent, the compound powder comprises carbide powder and/or oxide powder;

Step S4, stacking a plurality of sheets of coated NdFeB magnet blanks on top of each other to obtain a stack of NdFeB magnet blanks; and Step S5, performing three-stage heat treatment on the stack of NdFeB magnet blanks to obtain the NdFeB permanent magnet with high coercivity and high resistivity.

Preferably, in Step S3, the slurry comprises from 27 to 40 by mass of heavy rare earth powder, from 0.2 to 1.5 by mass of compound powder and from 58.5 to 72.8 by mass of organic solvent.

Preferably, the heavy rare earth powder has an average particle size in a range from 1 to 5 μm.

Preferably, the heavy rare earth powder comprises one or more selected from the group consisting of Dy elemental powder, Tb elemental powder, Dy alloy powder, and Tb alloy powder.

Preferably, the Dy alloy powder and Tb alloy powder are alloy powder formed by a combination of Dy element or Tb element with one or more selected from the group consisting of Al, Cu, Ga, Fe, Co elements.

Preferably, in Step S3, the compound powder has an average particle size in a range from 0.1 to 200 μm.

Preferably, in Step S3, the oxide powder comprises one or more selected from the group consisting of aluminum oxide powder, silicon oxide powder, and magnesium oxide powder, cerium oxide powder, and calcium oxide powder.

Preferably, in Step S3, the carbide powder is one selected from the group consisting of silicon carbide powder or tungsten carbide powder, or a combination thereof.

Preferably, in Step S3, the organic solvent comprises one or more selected from the group consisting of absolute ethanol, glycerin, and ethylene glycol.

Preferably, in Step S3, the slurry, coated on the surface of the clean NdFeB magnet blank, has a thickness in a range from 10 to 30 micron.

Preferably, in Step S3, coating is performed under the protection of the nitrogen.

Preferably, in Step S1, the NdFeB magnet blank has a thickness in a range from 1.5 to 6 mm.

Preferably, in Step S5, the three-stage heat treatment process further comprises: during the first stage of heat treatment, the blank is exposed to a high temperature of 1000° C.-1100° C. for 4 hours to 6 hours; during the second stage of heat treatment, the blank is exposed to a high temperature of 850° C.-950° C. for 4 hours to 10 hours; and during the third stage of heat treatment, the blank is exposed to a high temperature of 450° C.-550° C. for 2 hours to 6 hours.

According to a second aspect of the invention, there is provided an NdFeB permanent magnet with high coercivity and high resistivity formed by using the above-mentioned method, the NdFeB permanent magnet comprising alternately stacked high-coercivity magnet layers and high resistivity layer.

By adopting the above-mentioned technical solutions, the present invention has the following advantageous effects as compared to the prior art.

(1) In the present invention, a surface of an NdFeB permanent magnet blank is coated with slurry containing heavy rare earth element or alloy powder, carbide powder or oxide powder. Heavy rare earth penetrates into interior of the flaky magnets at a high temperature, so that coercivity of the flaky magnets is improved. However, part of the heavy rare earth elements or alloy elements and carbide powder or oxide powder, which are not penetrated into the flaky magnets, form an interlayer bonding two of flaky magnets together. In addition, the interlayer contains a high proportion of non-conductive elements, such as oxygen or carbon, whereby the resistivity of the whole magnet is further increased, that is, coercivity and resistivity of the NdFeB permanent magnets are increased at the same time by using the method provided in the present invention.

(2) In this application, only the surface of the magnet blank is coated with the slurry. However, in a conventional process, heavy rare earth is added to NdFeB alloy. Thus, if the former one is adopted, the amount of heavy rare earth elements can be greatly reduced and the cost is reduced.

(3) In this application, carbide powder and oxide powder are only added to the interlayer (ie, high-resistivity layer) between two flaky magnets but not added to interior of the magnets, so it does not have any adverse effects on the performance of the flaky magnets.

Figure 1:
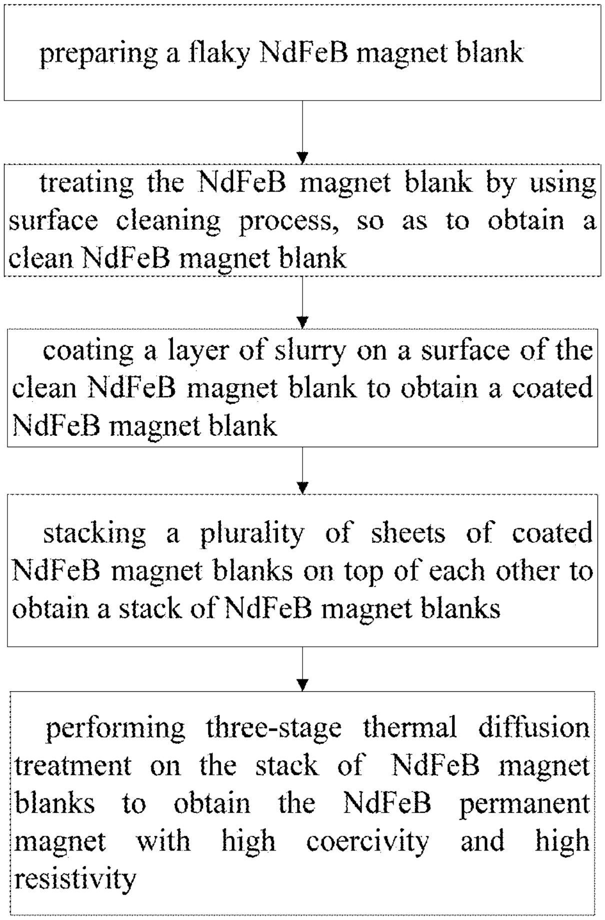
FIG. 1 is a flow chart illustrating a method for preparing an NdFeB permanent magnet in the invention.

Reference numerals in the drawings: 1—slurry; 2—high resistivity layer.

DETAILED DESCRIPTION

Figure 2:
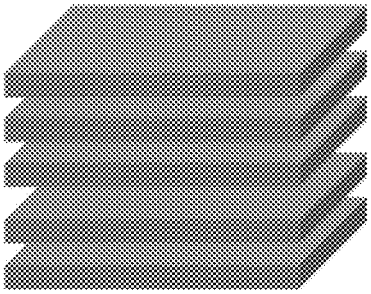
FIG. 2 is a schematic diagram showing a clean NdFeB magnet blank.
Figure 3:
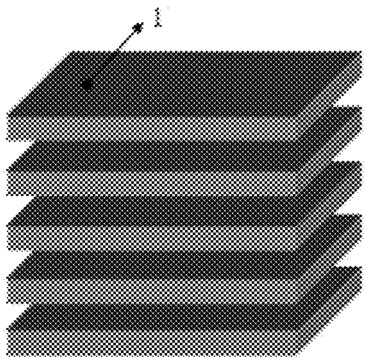
FIG. 3 is a schematic diagram showing a coated NdFeB magnet blank.
Figure 4:
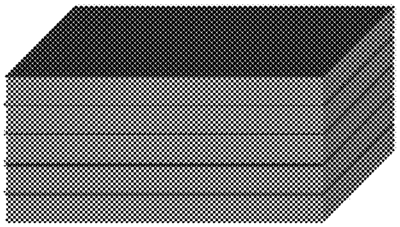
FIG. 4 is a schematic diagram showing a stack of NdFeB magnet blanks.
Figure 5:
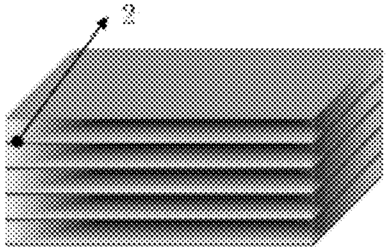
FIG. 5 is a schematic diagram showing an NdFeB permanent magnet with high coercivity and high resistivity.

According to one aspect of the invention, there is provided a method for preparing an NdFeB permanent magnet with high coercivity and high resistivity, as shown in FIG. 1, comprising the steps of:

Step S1, preparing a flaky NdFeB magnet blank;

Step S2, treating the NdFeB magnet blank by using surface cleaning process, so as to obtain a clean NdFeB magnet blank, as shown in FIG. 2;

Step S3, coating a layer of slurry on a surface of the clean NdFeB magnet blank to obtain a coated NdFeB magnet blank, as shown in FIG. 3, wherein the slurry comprises heavy rare earth powder (RE-T powder), compound powder (T-X powder) and organic solvent, the compound powder comprises carbide powder and/or oxide powder;

Step S4, stacking a plurality of sheets of coated NdFeB magnet blanks on top of each other to obtain a stack of NdFeB magnet blanks, as shown in FIG. 4; and Step S5, performing three-stage heat treatment on the stack of NdFeB magnet blanks to obtain the NdFeB permanent magnet with high coercivity and high resistivity, as shown in FIG. 5.

In an implementation, in Step S1, sintered NdFeB course magnet can be processed into flaky NdFeB magnet blank by using any known methods; furthermore, the NdFeB magnet blank has a thickness in a range from 1.5 mm to 6 mm.

In an implementation, in Step 2, impurities and oil stains can be removed from the surface of the flaky NdFeB magnet blank by the surface cleaning process, so that a clean and oil-free surface can be obtained; more preferably, the surface cleaning process is pickling.

In an implementation, in Step S3, the slurry comprises from 27 to 40 by mass of heavy rare earth powder, from 0.2 to 1.5 by mass of compound powder and from 58.5 to 72.8 by mass of organic solvent.

If the slurry has an excessive proportion of the compound powder, stacks of the NdFeB magnet blanks cannot be bonded together after subjected to the three-stage thermal diffusion process, hence an NdFeB permanent magnet with high coercivity and high resistivity cannot be formed.

In an embodiment, the heavy rare earth powder comprises heavy rare earth elemental powder and/or heavy rare earth alloy powder. Based on the principle of the grain boundary diffusion process, heavy rare earth elements penetrate into the inside of the flaky magnet at high temperature, and forms a (Nd, Dy) $_2Fe_{14}B$ phase with a high magnetocrystalline anisotropy field on the surface of the crystalline grain, thereby increasing the coercivity of the magnet.

Furthermore, the heavy rare earth element in the heavy rare earth powder is Dy element and/or Tb element; in particular, the heavy rare earth powder comprises one or more selected from the group consisting of Dy elemental powder, Tb elemental powder, Dy alloy powder, and Tb alloy powder.

In a preferred embodiment, the Dy alloy powder is alloy powder formed by a combination of the Dy element with one or more selected from the group consisting of Al, Cu, Ga, Fe, Co elements; and the Tb alloy powder is alloy powder formed by a combination of the Tb element with one or more selected from the group consisting of Al, Cu, Ga, Fe, Co elements; furthermore, the heavy rare earth alloy powder comprises one or more of the plurality of Dy alloy powder and/or one or more of the plurality of Tb alloy powder.

Furthermore, the heavy rare earth powder has an average particle size in a range from 1 to 5 μm.

In an implementation, the compound powder comprises carbide powder and/or oxide powder; furthermore, the oxide powder comprises one or more selected from the group consisting of aluminum oxide powder, silicon oxide powder, magnesium oxide powder, cerium oxide powder, and calcium oxide powder; more preferably, the oxide powder is aluminum oxide powder or calcium oxide powder.

In the three-stage thermal diffusion process, part of the heavy rare earth elements and carbide powder or oxide powder, which are not penetrated into the flaky magnets, form an interlayer bonding two of flaky magnets together. In addition, the interlayer contains a high proportion of non-conductive elements, such as oxygen or carbon, whereby the resistivity of the whole magnet is further increased, that is, coercivity and resistivity of the NdFeB permanent magnets are increased at the same time by using the method provided in the present invention.

Furthermore, the carbide powder is one selected from the group consisting of silicon carbide powder or tungsten carbide powder, or a combination thereof; more preferably, the carbide powder is silicon carbide powder.

Furthermore, the compound powder has an average particle size in a range from 0.1 to 200 μm.

In an implementation, the organic solvent (ET) comprises one or more selected from the group consisting of absolute ethanol, glycerin, and ethylene glycol; preferably, the organic solvent is absolute ethanol.

In an implementation, in Step S3, coating is performed under the protection of the nitrogen. The slurry, coated on the surface of the clean NdFeB magnet blank, has a thickness in a range from 10 to 30 micron.

In an implementation, in Step S4, the coated NdFeB magnet blanks are stacked on top of each other in a direction of thickness, wherein two to six layers of magnet blanks are stacked; more preferably, three layers of magnet blanks are stacked.

For the thermal diffusion process, in a preferred embodiment, in Step S5, the three-stage heat treatment process further comprises: during the first stage of heat treatment, the blank is exposed to a high temperature of 1000° C.-1100° C. for 4 hours to 6 hours; during the second stage of heat treatment, the blank is exposed to a high temperature of 850° C.-950° C. for 4 hours to 10 hours; and during the third stage of heat treatment, the blank is exposed to a high temperature of 450° C.-550° C. for 2 hours to 6 hours.

According to a second aspect of the invention, there is provided an NdFeB permanent magnet with high coercivity and high resistivity formed by using the above-mentioned method, the NdFeB permanent magnet comprising alternately stacked high-coercivity magnet layers and high resistivity layer 2.

The present invention will be described in details through specific examples, so as to better understand the present invention, but the following examples do not limit the scope of the present invention.

Grade 45SH magnets are used in the following examples and control examples. The magnets are processed to square magnets having a thickness of 30 mm×30 mm×2 mm after being subjected to sintering at a high temperature, and the magnets are stacked on top of each other in a thickness direction of 2 mm.

Compositions of the slurry used in the examples and the control examples are shown in Table 1:

TABLE 1

Composition Ratio of Slurry and Powder Particle Size in Examples 1-3 and Control Examples 1-3

| No. | Compositions of Slurry | | Composition Ratio of Slurry(% by weight) | Average Particle Size (μm) |
|---|---|---|---|---|
| Example 1 | RE-T powder | Dy—Fe | 35 | 3.5 |
| | T-X powder | Aluminum oxide | 1.5 | 0.023 |
| | ET | Ethyl alcohol | 63.5 | / |
| Example 2 | RE-T powder | Tb—Cu | 37 | 3.2 |
| | T-X powder | Silicon carbide | 0.7 | 0.042 |
| | ET | Ethyl alcohol | 62.3 | |
| Example 3 | RE-T powder | Tb | 30 | 2.8 |
| | T-X powder | Calcium oxide | 0.5 | 0.005 |
| | ET | Ethyl alcohol | 69.5 | / |
| Control Example 1 | | N/A | N/A | / |
| Control Example 2 | RE-T powder | Tb | 30.5 | 2.8 |
| | T-X powder | N/A | / | / |
| | ET | Ethyl alcohol | 69.5 | / |
| Control Example 3 | RE-T powder | Tb | 30 | 2.8 |
| | T-X powder | Calcium oxide | 4 | 0.005 |
| | ET | Ethyl alcohol | 69.5 | / |

(Note:
RE-T powder is heavy rare earth powder, T-X powder is compound powder, and ET powder is organic solvent.)

Example 1

This example provides a method for preparing an NdFeB permanent magnet with high coercivity and high resistivity, comprising the steps of:

Step S1, preparing a flaky NdFeB magnet blank having a dimension of 30 mm×30 mm×2 mm;

Step S2, performing surface cleaning on the NdFeB magnet blank by pickling process to remove impurities, such as oil stains, from the surface, so as to obtain a clean NdFeB magnet blank;

Step S3, having the clean NdFeB magnet blank lying flat on a tray; spraying the slurry on two surfaces of the clean NdFeB magnet blank having a size of 30 mm×30 mm by using a spraying equipment under the protection of nitrogen, and drying the surfaces of the magnet to obtain a coated NdFeB magnet blank; wherein the slurry was formulated as follows: make the slurry according to the composition ratio and the powder particle size shown in Table 1, and the slurry was stirred for 1 hour after it was prepared;

Step S4, stacking a plurality of sheets of coated NdFeB magnet blanks on top of each other in a thickness direction of 2 mm to obtain a stack of NdFeB magnet blanks, wherein three layers of NdFeB magnet blanks are stacked;

Step S5, placing the stack of NdFeB magnet blanks at a temperature of 1010° C. for 5 hours, followed by nitrogen filling to cool the stack at a rate of 10° C./min; after it was cooled to room temperature, tempering was performed. For the tempering process, the first stage was to expose it to a temperature of 900° C. for 4 hours, then perform nitrogen filling to cool the stack at a rate of 10° C./min; after it was cooled to room temperature, a second stage of tempering was performed, that is, it was exposed to a temperature of 500° C. for 4 hours, then perform nitrogen filling to cool the stack at a rate of 10° C./min until it was cooled to room temperature, to obtain the NdFeB permanent magnet with high coercivity and high resistivity.

Examples 2-3

Examples 2-3 are established based on Example 1, however, they differ from Example 1 in that the composition ratio of slurry and the powder particle size are different. The slurry of Examples 2-3 was prepared according to the composition ratio and the powder particle size shown in Table 1, and an NdFeB permanent magnet with high coercivity and high resistivity was prepared according to the method shown in Step S1.

Control Example 1

Step A1, grade 45SH magnets was used. The magnets were processed to square magnets having a thickness of 30 mm×30 mm×2 mm after being subjected to sintering at a high temperature, and the magnets were stacked on top of each other in a thickness direction of 2 mm, wherein three layers of the magnets were stacked;

Step A2: same as Step S5 in Example 1.

Control Example 2

Control example 2 is established based on Example 1, however, it differs from Example 1 in that the composition ratio of slurry and the powder particle size are different. The slurry of Control example 2 was prepared according to the composition ratio and the powder particle size shown in Table 1, and an NdFeB permanent magnet with high coercivity and high resistivity was prepared according to the method shown in Step S1.

Control Example 3

Control example 3 is established based on Example 1, however, it differs from Example 1 in that the composition ratio of slurry and the powder particle size are different. The slurry of Control example 3 was prepared according to the composition ratio and the powder particle size shown in Table 1, and an NdFeB permanent magnet with high coercivity and high resistivity was prepared according to the method shown in Step S1.

Performance Test

NdFeB permanent magnets obtained in Examples 1-3 and Control Examples 1-3 were processed into sample columns having dimensions of 10 mm×10 mm×6 mm to measure magnetic properties. The performance test method refers to GB13560-2007.

The NdFeB permanent magnets obtained in Examples 1-3 and Control Examples 1-3 were processed into samples having dimension of 2 mm×2 mm×6 mm to measure resistivity.

Test result is shown in FIG. 2:

TABLE 2

Coercivity and resistivity of NdFeB permanent magnets obtained in Examples 1-3 and Control Examples 1-3

| NO. | Spraying Thickness (μm) | Resistivity (μΩ · cm) | Remanence (kGs) | Coercivity (kOe) |
|---|---|---|---|---|
| Example 1 | 20 | 2523 | 13.19 | 27.4 |
| Example 2 | 20 | 3169 | 13.18 | 29.5 |
| Example 3 | 15 | 2847 | 13.22 | 30.3 |
| Control Example 1 | N/A | 151 | 13.45 | 20.6 |
| Control Example 2 | 15 | 149 | 13.23 | 30.4 |
| Control Example 3 | 15 | magnetic layer is not well bonded with layer, so test cannot be done | 13.25 | 29.8 |

It can be seen from the test results in Table 2 that coercivity of slurry-coated NdFeB permanent magnets is increased. For example, coercivity of the NdFeB permanent magnet, onto which slurry containing Dy is sprayed, is increased by 6.8 kOe, as shown in Example 1. Coercivity of the NdFeB permanent magnet, onto which slurry containing Tb is sprayed, is increased by 9.7 kOe, as shown in Example 3. This is because after they are subjected to sintering treatment at a high temperature, heavy rare earth Dy or Tb coated on the surface enter into interior of the magnet, so that magnetocrystalline anisotropy field on the boundary of the magnet is increased, and coercivity of the magnet is increased. In addition, resistivity of magnets into which aluminum oxide powder, calcium oxide powder and silicon carbide powder are added is greatly improved. It is because the non-conductive powder is distributed on an interlayer between two magnets, and resistance is increased. While such an increase in resistance can reduce eddy loss during the use of the magnet.

Comparing the test results of Example 3 and Control Example 3, it can be seen that if the content of the compound powder in the slurry is too high, the stack of NdFeB magnet blanks will not be bonded together after they are subjected to the three-stage thermal diffusion process. As a result, an NdFeB permanent magnet with high coercivity and high resistivity according to the present invention cannot be formed.

In conclusion, coercivity and resistivity of magnets are greatly improved by spraying slurry containing heavy rare earth powder, oxide powder and carbide powder, etc., and by performing thermal diffusion treatment on the magnets.

The above descriptions are only the preferred embodiments of the invention, not thus limiting the embodiments and scope of the invention. Those skilled in the art should be able to realize that the schemes obtained from the content of specification and drawings of the invention are within the scope of the invention.

What is claimed is:

1. A method for preparing an NdFeB permanent magnet, wherein coercivity of the NdFeB permanent magnet is not lower than 27.4 kOe, and resistivity of the NdFeB permanent magnet is not lower than 2523 μΩ·cm; the method comprising the steps of:

Step S1, preparing a flaky NdFeB magnet blank;

Step S2, treating the NdFeB magnet blank by using surface cleaning process, so as to obtain a clean NdFeB magnet blank;

Step S3, coating a layer of slurry on a surface of the clean NdFeB magnet blank to obtain a coated NdFeB magnet blank, wherein the slurry comprises heavy rare earth powder, compound powder and organic solvent, the compound powder comprises carbide powder and/or oxide powder;

Step S4, stacking a plurality of sheets of coated NdFeB magnet blanks on top of each other to obtain a stack of NdFeB magnet blanks; and Step S5, performing three-stage thermal diffusion treatment on the stack of NdFeB magnet blanks to obtain the NdFeB permanent magnet with the coercivity and the resistivity, wherein the three-stage thermal diffusion treatment comprises: during the first stage of heat treatment, the blank is exposed to a high temperature of 1000° C.-1100° C. for 4 hours to 6 hours; during the second stage of heat treatment, the blank is exposed to a high temperature of 850° C.-950° C. for 4 hours to 10 hours; and during the third stage of heat treatment, the blank is exposed to a high temperature of 450° C.-550° C. for 2 hours to 6 hours.

2. The method for preparing an NdFeB permanent magnet of claim 1, wherein in Step S3, the slurry comprises from 27 to 40 by mass of heavy rare earth powder, from 0.2 to 1.5 by mass of compound powder and from 58.5 to 72.8 by mass of organic solvent.

3. The method for preparing an NdFeB permanent magnet of claim 1, wherein in Step S3, the heavy rare earth powder has an average particle size in a range from 1 to 5 μm.

4. The method for preparing an NdFeB permanent magnet of claim 1, wherein in Step S3, the heavy rare earth powder comprises one or more selected from the group consisting of Dy elemental powder, Tb elemental powder, Dy alloy powder, and Tb alloy powder.

5. The method for preparing an NdFeB permanent magnet of claim 4, wherein the Dy alloy powder and Tb alloy powder are alloy powder formed by a combination of Dy element or Tb element with one or more selected from the group consisting of Al, Cu, Ga, Fe, Co elements.

6. The method for preparing an NdFeB permanent magnet of claim 1, wherein in Step S3, the compound powder has an average particle size in a range from 0.1 to 200 μm.

7. The method for preparing an NdFeB permanent magnet of claim 1, wherein in Step S3, the oxide powder comprises one or more selected from the group consisting of aluminum oxide powder, silicon oxide powder, and magnesium oxide powder, cerium oxide powder, and calcium oxide powder.

8. The method for preparing an NdFeB permanent magnet of claim 1, wherein in Step S3, the carbide powder is one selected from the group consisting of silicon carbide powder or tungsten carbide powder, or a combination thereof.

9. The method for preparing an NdFeB permanent magnet of claim 1, wherein in Step S3, the organic solvent comprises one or more selected from the group consisting of absolute ethanol, glycerin, and ethylene glycol.

10. The method for preparing an NdFeB permanent magnet of claim 1, wherein in Step S3, the slurry, coated on the surface of the clean NdFeB magnet blank, has a thickness in a range from 10 to 30 micron.

11. The method for preparing an NdFeB permanent magnet of claim 1, wherein in Step S3, coating is performed under the protection of the nitrogen.

12. The method for preparing an NdFeB permanent magnet of claim 1, wherein in Step S1, the NdFeB magnet blank has a thickness in a range from 1.5 to 6 mm.

* * * * *